Figure 1:
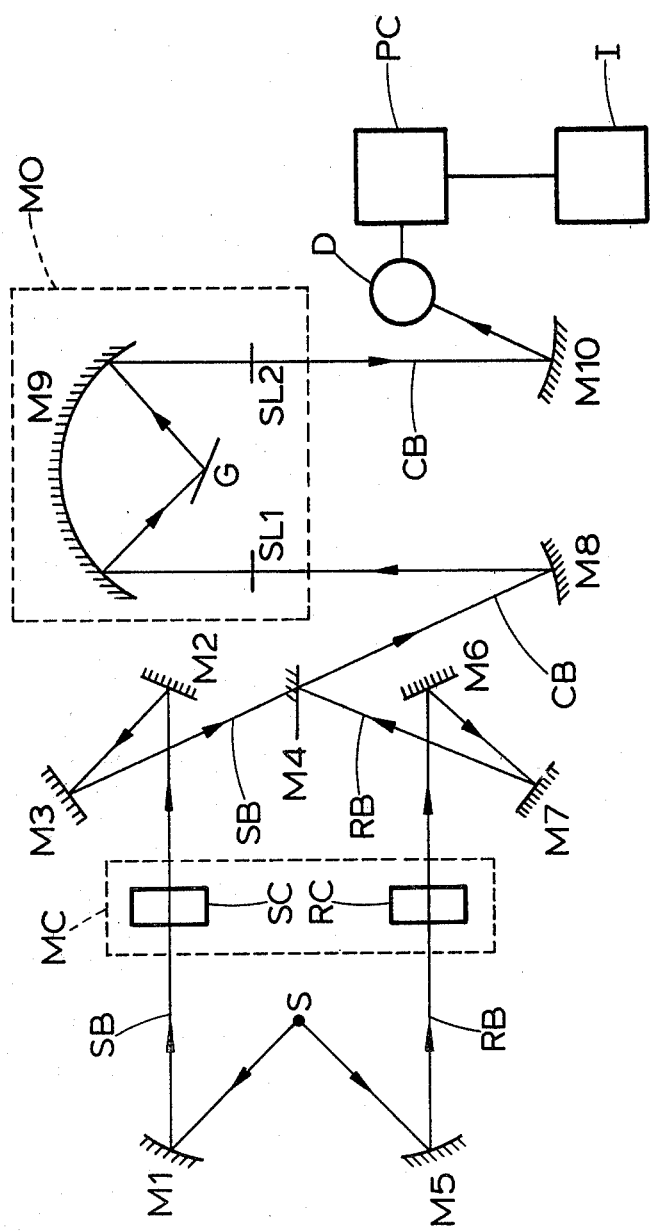

United States Patent [19]

Barlow et al.

[11] 4,307,960

[45] Dec. 29, 1981

[54] SPECTROPHOTOMETER

[75] Inventors: Derek Barlow; Charles V. Perkins, both of Cambridge, England

[73] Assignee: U.S. Philips Corporation, New York, N.Y.

[21] Appl. No.: 125,012

[22] Filed: Feb. 27, 1980

[30] Foreign Application Priority Data

Mar. 5, 1979 [GB] United Kingdom ............... 07618/79

[51] Int. Cl.³ ............................................. G01J 3/42
[52] U.S. Cl. ................................................... 356/323
[58] Field of Search ............................... 356/319–325, 356/306

[56] References Cited

U.S. PATENT DOCUMENTS

| 3,428,401 | 2/1969 | Buzza | 356/306 X |
| 3,659,941 | 5/1972 | Tong | 356/325 X |
| 4,055,768 | 10/1977 | Bromberg | 356/317 X |

Primary Examiner—F. L. Evans
Attorney, Agent, or Firm—Paul R. Miller

[57] ABSTRACT

A dual-beam ratio recording spectrophotometer has signal processing circuitry for determining the transmittance of a substrate. The signal processing circuitry has a bandwidth which is dependent on the magnitude of the radiation passing through a reference cell and includes control logic circuitry which produces a pulse whose width is proportional to the square of the magnitude of the radiation detected when the beam passes through the reference cell. A sample and hold circuit whose sample time is controlled by this pulse samples the output of an integrator which produces at regular intervals a signal representative of the transmittance of a substance. Thus, the response time of the sample and hold circuit and hence the bandwidth of the signal processing circuitry depends on the magnitude of the radiation passing through the reference cell.

7 Claims, 9 Drawing Figures

SPECTROPHOTOMETER

The present invention relates to a dual beam ratio recording spectrophotometer comprising a radiation source, a radiation detector, a first path between the source and detector which includes a sample cell, a second path between the source and detector which includes a reference cell, means for alternately directing radiation following the first and second paths onto the detector, and a processing circuit for processing the output signals from the detector, the processing circuit having means for producing a characteristic signal representative of a characteristic of a substance in the sample cell and for updating this characteristic signal at regular intervals, and the processing circuit having means for measuring the characteristic signal.

Dual beam spectrophotometers may be classified as either null balance or ratio recording types. A null balance spectrophotometer includes a variable optical attenuator which is inserted in one or both of the radiation paths and is driven by a servo system until the intensity of the radiation reaching the detector via the reference cell is equal to that reaching the detector via the sample cell. By its nature the response time of this form of instrument increases as the energy level of the radiation is reduced since the drive to the servo is reduced. This is advantageous as it reduces the effect of noise on the system which would otherwise be increased as a proportion of the wanted signal. There is however a corresponding disadvantage of an increasing "dead band" i.e. the error signal required to operate the servo system becomes a greater proportion of the wanted signal. The display in this form of spectrophotometer is conventionally a chart recorder controlled by the servo system which drives the variable attentuator.

Dual beam ratio recording spectrophotometers of the type described in the opening paragraph have the advantage that there is no "dead zone" since an error signal is not required but in known spectrophotometers of this type the frequency response of the processing circuit is independent of the signal level and hence as the signal level decreases the effect of noise on the signal increases. If a scan is run with a large dynamic range of signal the noise performance will not be optimised over the whole scan.

It is an object of the invention to provide a dual beam ratio recording spectrophotometer in which the effect of noise on the signal when the signal level decreases is reduced.

The invention provides a dual beam ratio recording spectrophotometer of the type described in the opening paragraph, characterised in that the measuring means has a bandwidth which is dependent on the magnitude of the radiation received by the detector via the second path.

Thus if at a particular wavelength of interest the radiation emitted by the source falls to a low level or the absorption of radiation by a solvent in which the sample is dissolved increases then the bandwidth of the processing circuit is reduced to reduce the effect of noise on the wanted signal. Since the noise output of a system is proportional to bandwidth the bandwidth of the measuring means may be made proportional to the square of the magnitude of the radiation received by the detector via the second path.

In order to produce a variable bandwidth the measuring means may include a sample and hold circuit in which the sample time and hence the bandwidth of the measuring means is made dependent on the magnitude of the radiation received by the detector via the second path. This method of controlling the bandwidth enables an appropriate correction to be made over a large dynamic range of input signals. An alternative method of controlling the bandwidth would be the use of variable gain reactive feedback loops. However semiconductor variable gain elements tend to be non-linear when working with large signal variations over a large dynamic range of gain. Consequently the signals have to kept at a low level. Further the gain of these elements is often not well defined and further feedback loops have to be incorporated to define their gain accurately.

Since the bandwidth of the measuring means is to be dependent on the magnitude of the radiation received via the second path it is necessary that either the bandwidth required be stored for the intervals between the times when the radiation follows the second path or that this magnitude be stored. Thus the measuring means may include a second sample and hold circuit for sampling the magnitude of the radiation received by the detector via the second path and producing an output dependent thereon which is used to determine the sample time of the first mentioned sample and hold circuit.

In order to make the bandwidth proportional to the square of the signal magnitude the output of the second sample and hold circuit may be fed to a squaring circuit whose output is used to determine the sample time of the first mentioned sample and hold circuit.

In U.K. Pat. No. 1,086,559 a flame photometer is described in which an unknown quantity of one element, e.g. sodium in a blood sample, and a known quantity of a second element, e.g. lithium introduced into the blood sample, are atomized and introduced into a flame and in which a rotating filter disc has sectors transmitting the respective principal emission lines to a detector to produce sample and reference signals which are separately integrated in respective capacitors until the reference integral reaches a predetermined value, the detector output being then interrupted. The integrated sample signal is then indicated on a meter which may be directly calibrated to indicate the quantity of the unknown element. It is stated that by integrating over a sufficient length of time a high signal-to-noise ratio is obtained, an example being 25 seconds during which approximately 700 bits of information for each wavelength channel is provided. It is also stated that the instrument need not normally be recalibrated since if the temperature of the flame is less or the sample flow rate diminishes, the integration takes place over a longer period of time until the same voltage is present across the reference capacitor.

Thus in the flame photometer described in U.K. Pat. No. 1,086,559, the variable time which is allowed before the detector output is interrupted will accommodate variations in signal level. However, this teaching is not compatible with dual beam ratio recording spectrophotometers of the type to which the present invention relates in which the characteristic signal is updated at regular intervals, this regular updating being particularly relevant to the use of such spectrophotometers as scanning instruments.

In a spectrophotometer according to the invention, the means for producing and updating the characteristic signal may include means for sampling the output signals from the detector to produce first and second signals dependent on the magnitude of the radiation received by the detector via the first and second paths respectively, means for maintaining the second signal constant, means for separately integrating the first signal and the constant second signal over a period of time necessary for the integrated value of the constant second signal to reach a predetermined value such that at the end of that period of time the integrated value of the first signal is the characteristic signal, and means for resetting the integrating means at regular intervals. Furthermore, the means for resetting the integrating means at regular intervals may be operative each time after radiation following the first path has been directed onto the detector and each time after radiation following the second path has been directed onto the detector. This fast updating of the characteristic signal enables the spectrophotometer to perform a fast scan with the measured results displaying a continuous trace on a chart recorder or similar indicating device. It may be noted that the long integration time of the flame photometer disclosed in the above-mentioned U.K. Pat. No. 1,086,559 is incompatible with use of that instrument in a fast scanning mode since the long intervals between measured results will produce a discontinuous trace on a recorder.

Figure 2:
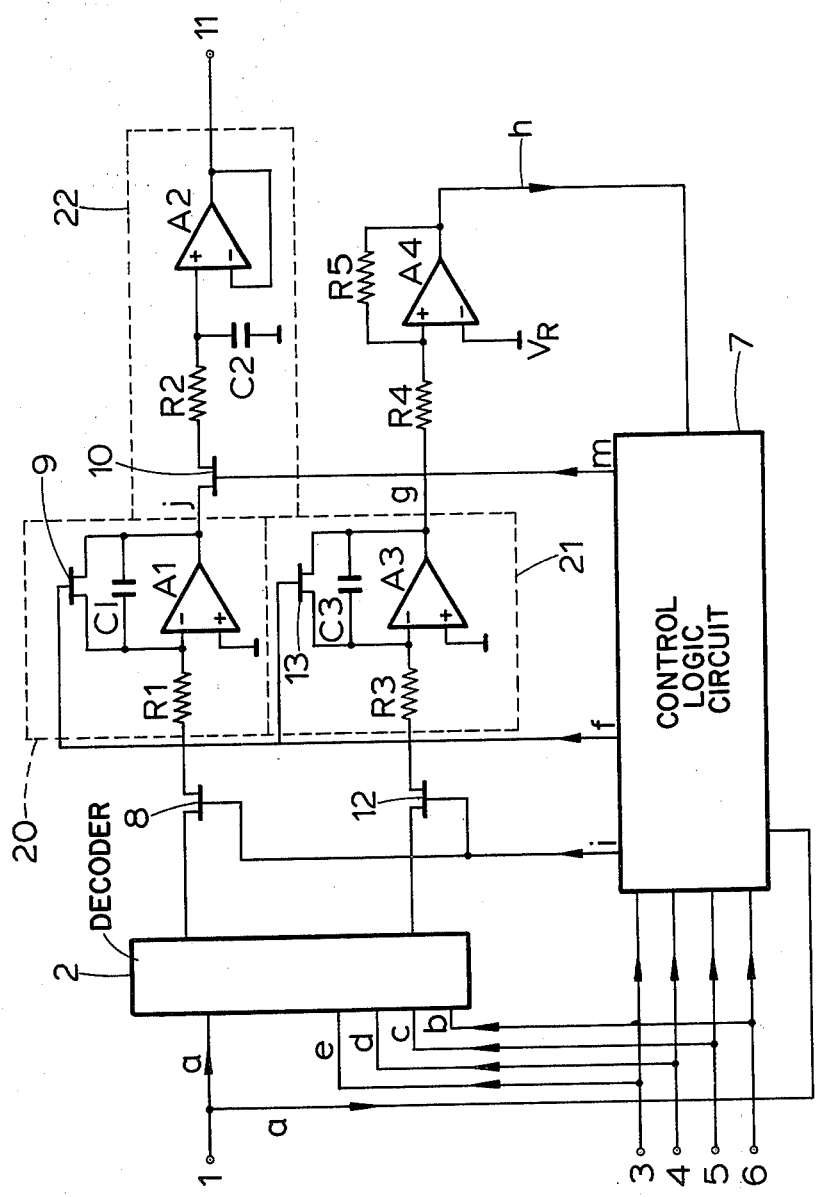
Figure 3:
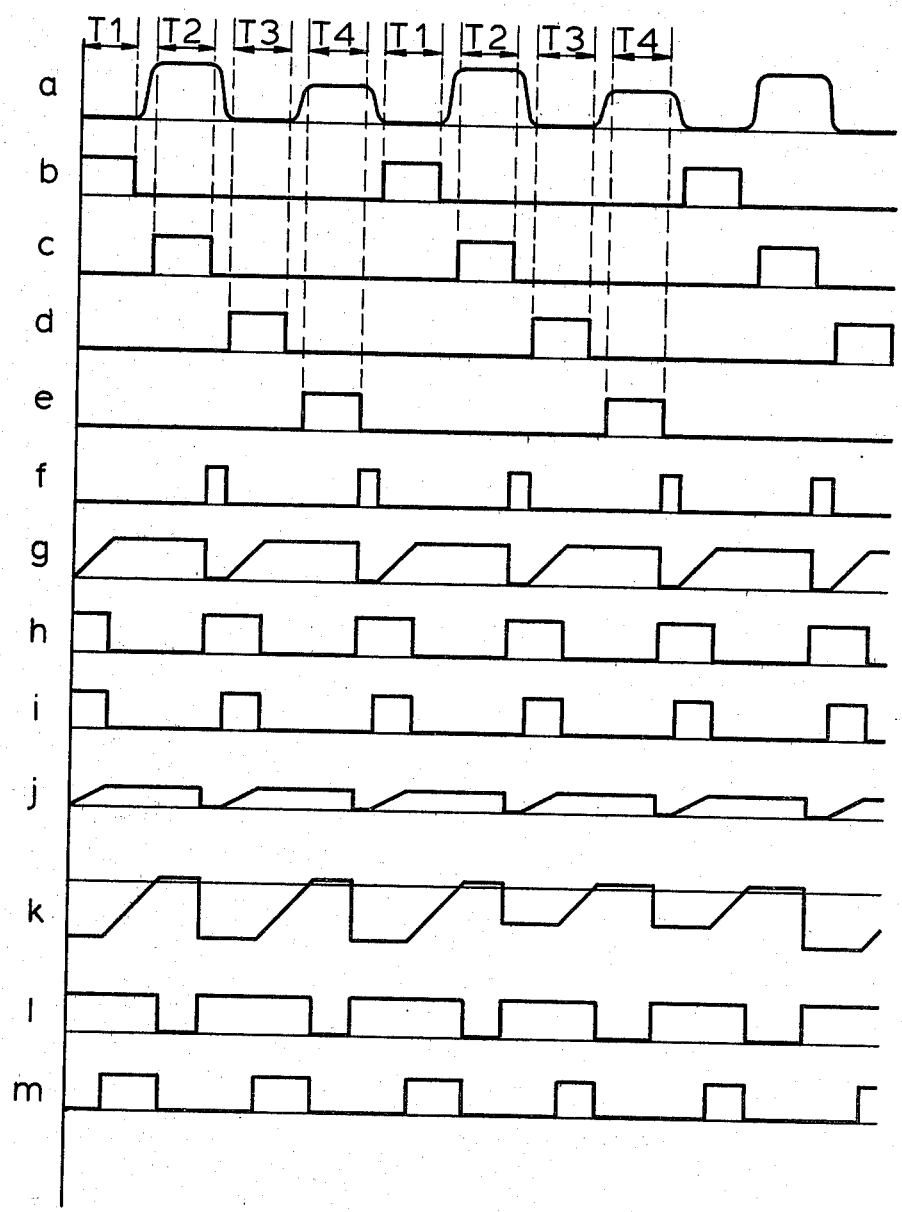
Figure 4:
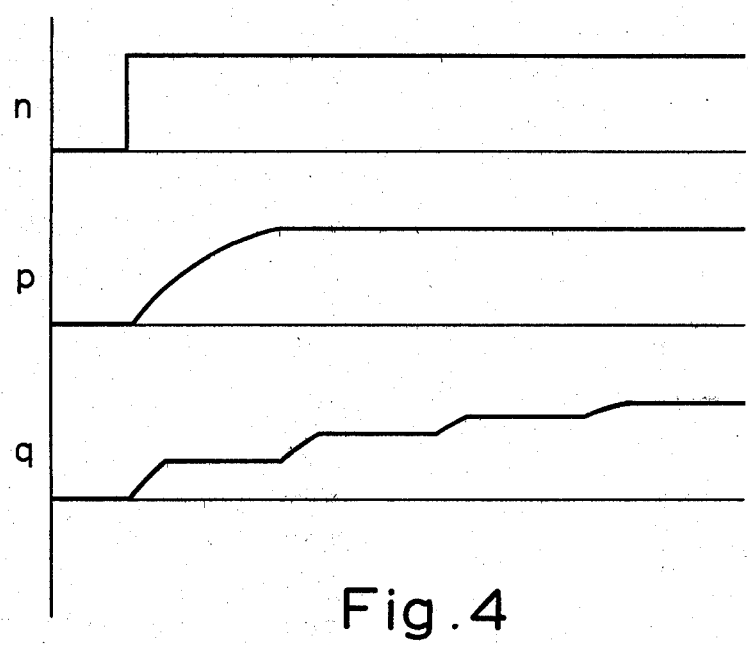
Figure 9:
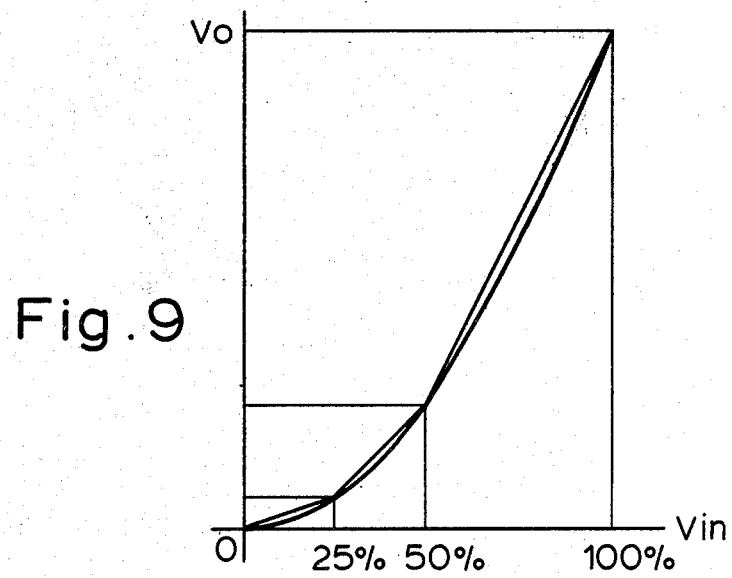
Figure 5:
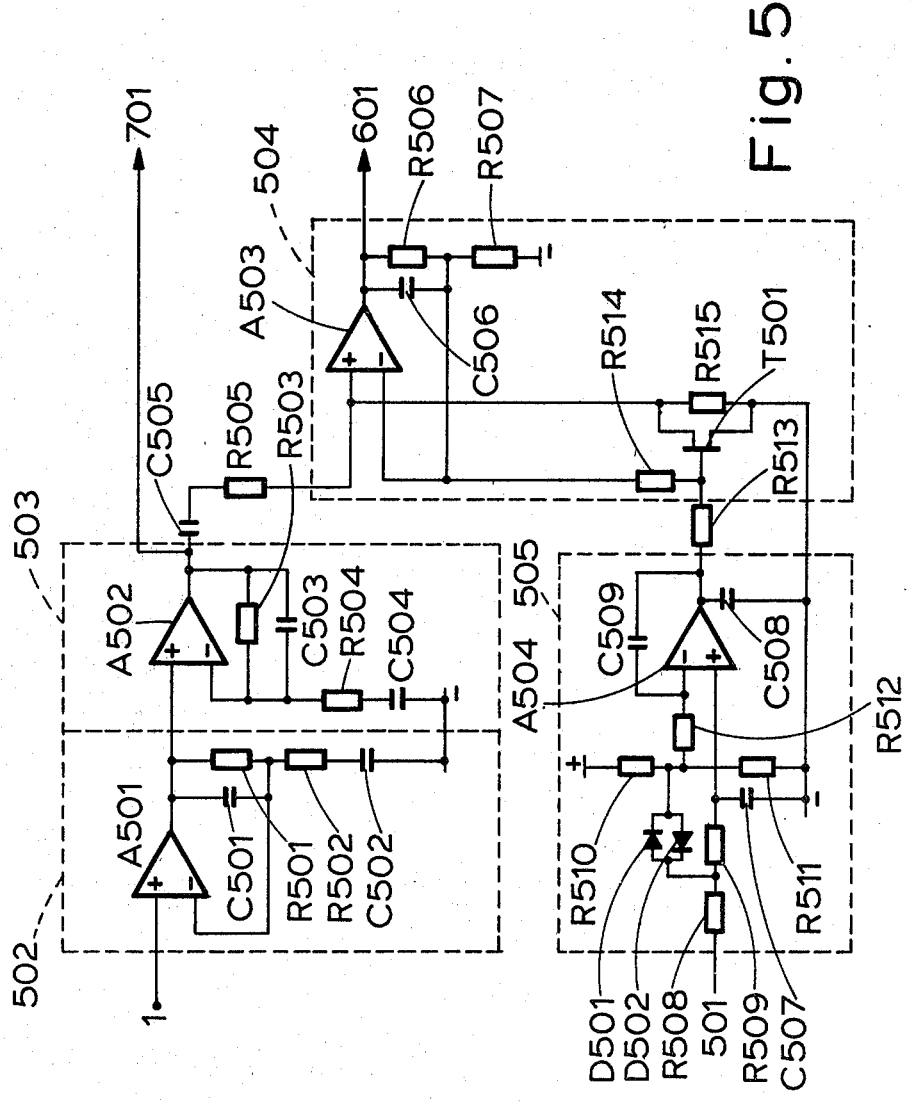
Figure 6:
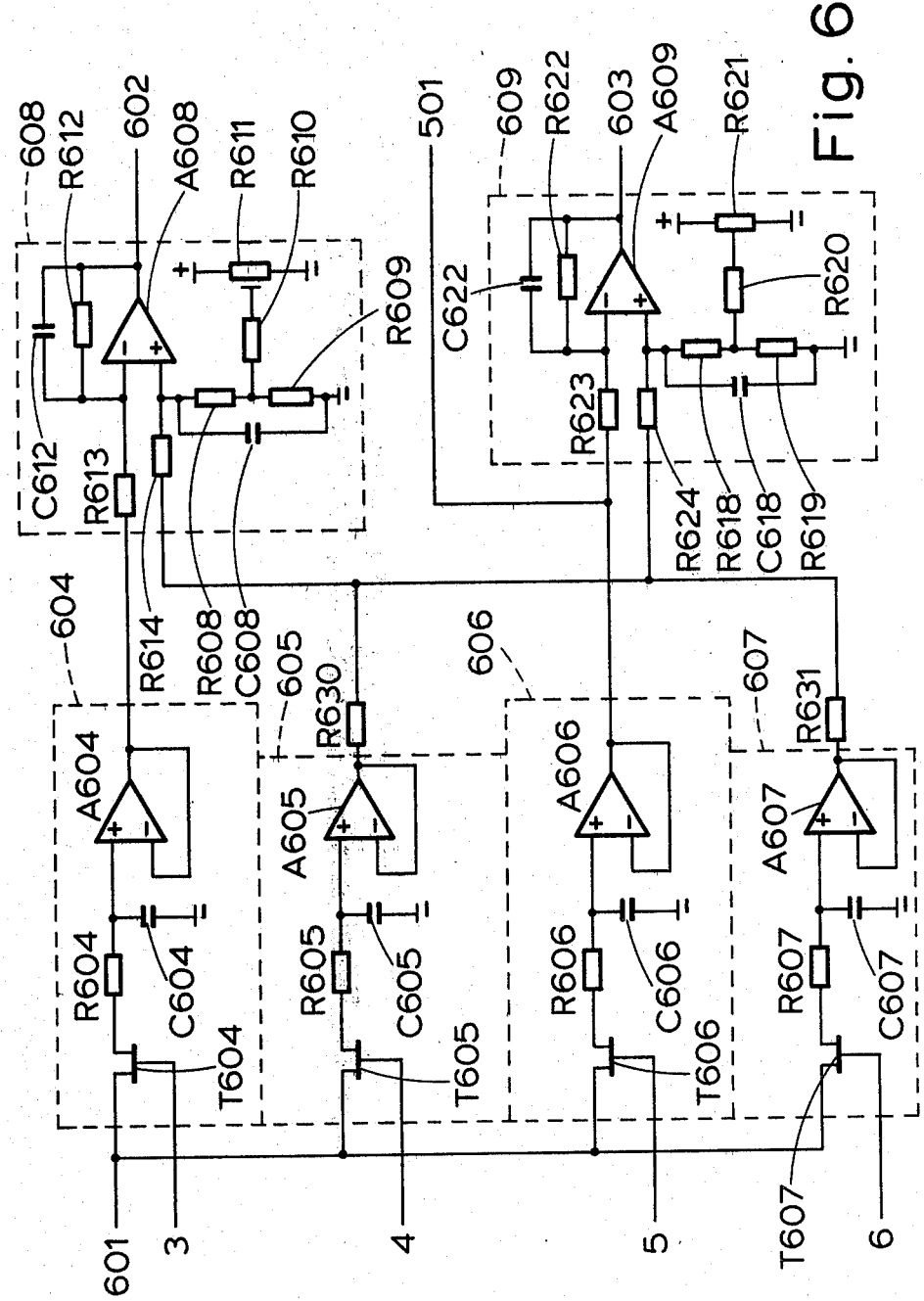
Figure 7:
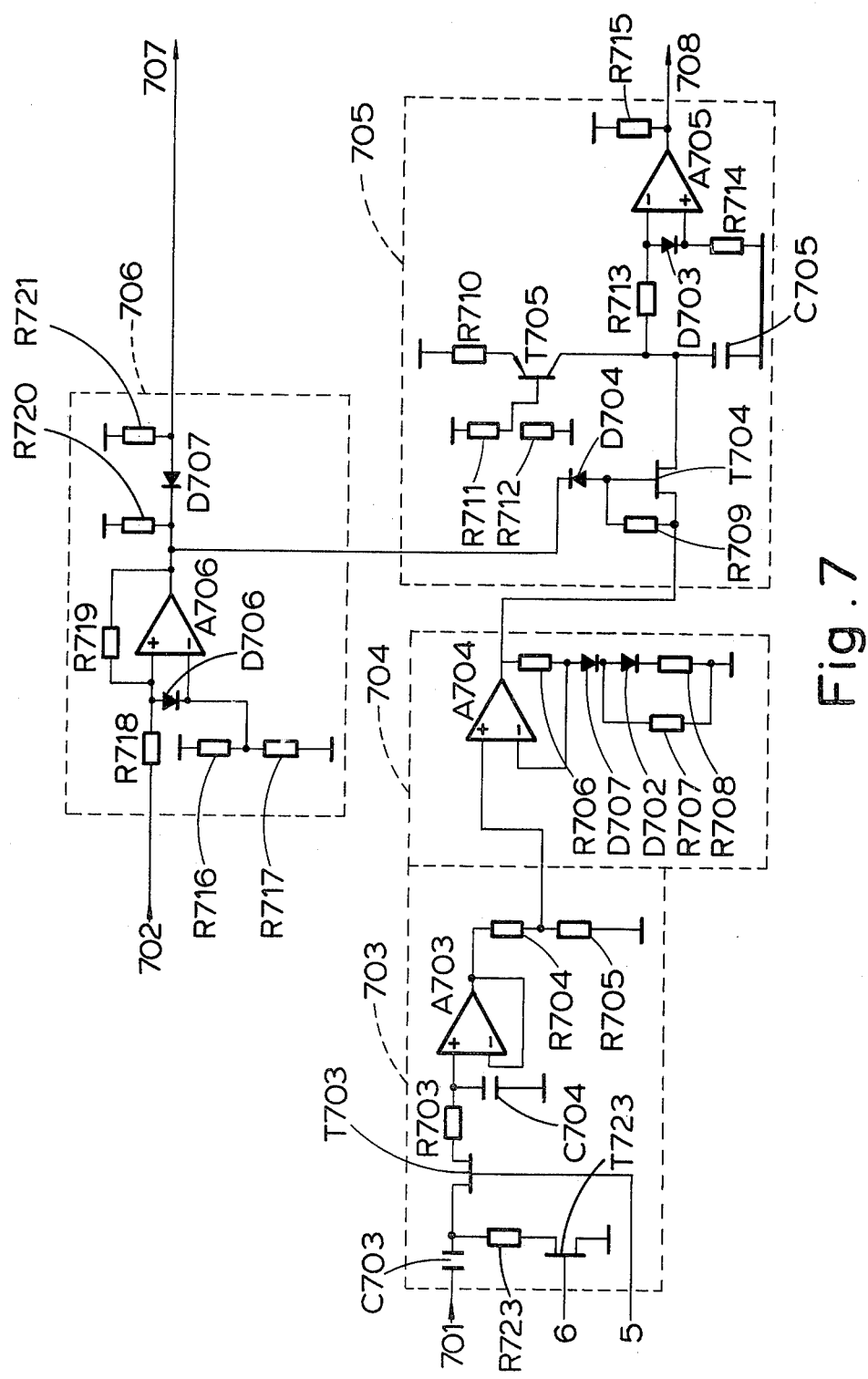
Figure 8:
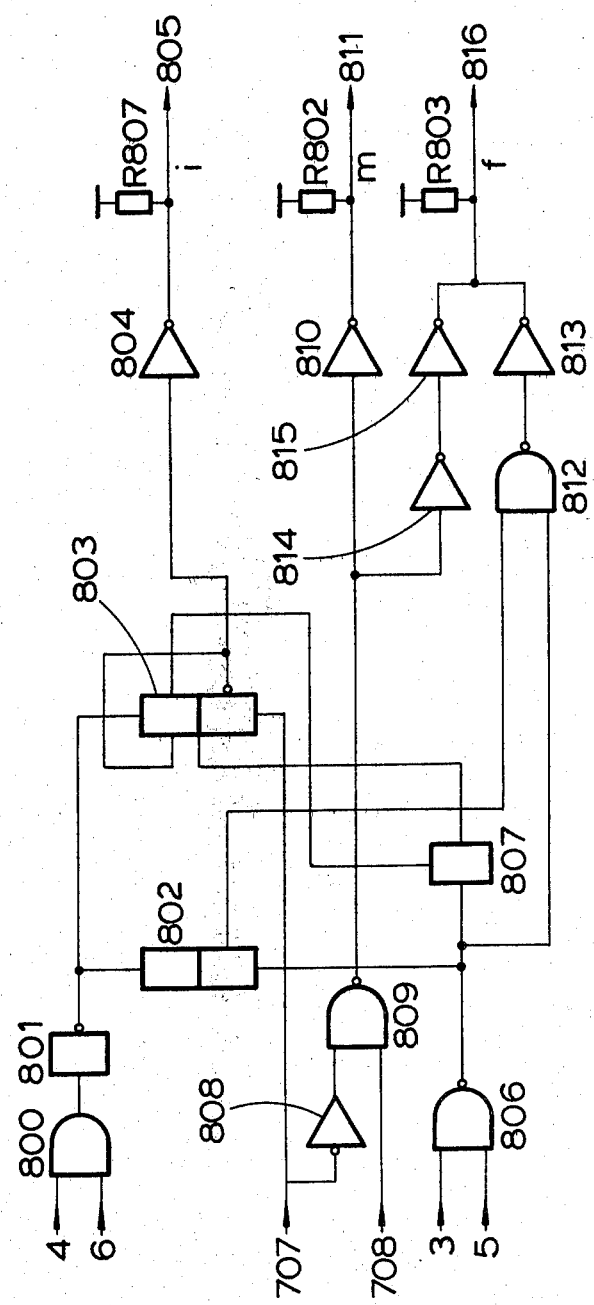

An embodiment of the invention will now be described, by way of example, with reference to the accompanying drawings, in which:

FIG. 1 shows in diagrammatic form a dual beam spectrophotometer according to the invention, FIG. 2 shows a signal processing circuit for use in the spectrophotometer of FIG. 1, FIG. 3 shows a series of waveforms illustrating the operation of the processing circuit of FIG. 2, FIG. 4 illustrates the response of the sample and hold circuit of FIG. 2 to a step input, FIG. 5 shows an amplifier for insertion between the radiation detector and an input of the circuit of FIG. 2, FIG. 6 shows in greater detail the decoding circuit of FIG. 2, FIGS. 7 and 8 show in greater detail the control logic circuit of FIG. 2, and FIG. 9 shows the response of a squaring circuit in the control logic circuit.

The spectrophotometer shown in FIG. 1 comprises a source of radiation S, means for forming two beams of radiation, means for combining the two beams, a monochromator M0, a detector D and a signal processing circuit PC.

Radiation from source S, which may be the infra-red, visible or ultra violet regions of the spectrum, is reflected by a mirror M1 along the path SB which passes through a sample cell SC within a measurement compartment MC. The radiation following path SB is reflected by two further mirrors M2 and M3 onto a rotating sector mirror assembly M4 which alternately allows the radiation following the path SB to fall on a mirror M8 and reflects it away from the mirror M8. Radiation from source S is also reflected by a mirror M5 along a second path RB which passes through a reference cell RC, which is also located in the measurement compartment MC. The radiation following path RB is reflected by two further mirrors M6 and M7 onto the rotating sector mirror assembly M4 which alternately reflects the radiation following the path RB onto the mirror M8 or allows it to pass through and thus be directed away from the mirror M8. Thus a composite beam CB which comprises pulses of radiation which have followed path SB interlaced with pulses of radiation which have followed path RB is formed. The rotating mirror M4 has successive sectors which are radiation transparent, radiation absorbing, radiation reflective and radiation absorbing in series thus causing the composite beam CB to comprise interlaced pulses of radiation which have followed paths SB and RB respectively separated by periods in which radiation from the source is interrupted. The composite beam CB is reflected by mirror M8 onto an entrance slit SL1 of a monochromator M0. The monochromator M0 comprises the entrance slit SL1, a concave mirror M9, a diffraction grating G and an exit slit SL2 and is used to select radiation of a narrow band of wavelengths from the wideband radiation presented to the entrance slit SL1. The narrow band radiation emerging from the exit slit SL2 is reflected onto a detector D by a mirror M10. The output of the detector D is fed via signal processing circuit PC to an indicator I.

In order to determine the transmittance of a sample it is inserted in the measurement compartment MC so as to be traversed by the sample beam and the signal processing means PC is arranged to determine the ratio of the magnitude of the radiation emerging from the sample cell SC to that emerging from the reference cell RC. If the magnitude of the radiation emitted from the source S is small then the signal produced at the output of the detector D will be small and hence the effect of noise in the system will be increased. Since the total noise produced at the output of the signal processing circuit PC is proportional to the square root of its bandwidth the effect of the noise can be reduced by reducing the bandwidth as the magnitude of the radiation reaching the detector D via path RB is reduced. This procedure may also be expressed as increasing the response time of the signal processing circuit PC as the magnitude of the radiation is reduced. It will be appreciated that this increase in the response time, or decrease in bandwidth, will prevent the system responding to fast changes in the level of radiation emerging from the sample cell SC and will thus limit the rate of change of wavelength produced by the monochromator M0 if meaningful measurements are to be made.

The indicator I is typically a chart recorder in which the chart is advanced in synchronism with the wavelength change of the monochromator. However, other indicators could be used, for example video display units, or the output of the signal processing circuit PC could be fed to a computer which could either store the information or drive a printer to produce a print out of transmittance against wavelength.

FIG. 2 shows in block schematic form one embodiment of a processing circuit suitable for use in the spectrophotometer of FIG. 1. The signal from the detector D is applied via a terminal 1 to a first input of a decoder 2 and to a first input of a control logic circuit 7. Four timing signals derived from devices sensing the position of the rotating mirror assembly M4 are applied via terminals 3, 4, 5 and 6 to further inputs of the decoder 2 and of the control logic circuit 7. The decoder 2 has a first output which is connected via an FET 8 to an integrator 20 which comprises a resistor R1, capacitor C1 and an operational amplifier A1. An FET 9 is connected across the capacitor C1. The output of the integrator 20 is fed to a sample and hold circuit 22 comprising an FET 10, a resistor R2, a capacitor C2 and an operational amplifier A2 the output of which is connected to an output terminal 11 of the processing circuit. A second output of the decoder 2 is connected via an FET 12 to a second integrator 21 which comprises a resistor R3, a capacitor C3 and an operational amplifier A3. An FET 13 is connected across capacitor C3. The output of the second integrator 21 is connected to one input of a comparator circuit which comprises resistors R4 and R5 and a fast comparator A4. The other input of the comparator is connected to a reference potential VR. The output of the comparator is connected to a further input of the control logic circuit 7. The control logic circuit has three outputs the first being connected to the gate electrodes of FET's 8 and 12, the second to the gate electrode of FET's 9 and 13 and the third to the gate electrode of FET 10.

FIG. 3 shows a number of the waveforms occurring at various points in the processing circuit shown in FIG. 2. Waveform a illustrates the composite waveform from the detector D which is applied at terminal 1. The four time periods T1, T2, T3 and T4 correspond to a first period when the radiation beam is absorbed within the mirror system, a period during which the radiation beam passes through the reference cell before falling on the detector D, a second period during which the radiation beam is absorbed within the mirror system, and a period during which the radiation beam passes through the sample cell before falling on the detector respectively. Waveforms b, c, d and e illustrate the four timing signals applied to the decoder 2 and control logic 7 and which correspond to the periods T1 to T4. Using these timing signals the decoder presents at its first output a signal hereinafter called Sample-Dark representing the detector output during the period T4 minus the average of that during the latest of periods T1 and T3 and at its second output a signal hereinafter called Ref-Dark representing the detector output during the period T2 minus the average of that during the latest of periods T1 and T3. During the periods between the end of T2 and the beginning of T3 and the end of T4 and the beginning of T1 the control logic 7 produces a signal shown as waveform f. This signal is applied to the gate electrodes of FET's 9 and 13 to discharge capacitors C1 and C3 and thus reset the two integrators. At the start of periods T1 and T3 the control logic 7 produces an output signal shown as waveform i which allows the integrators 20 and 21 to integrate the first and second outputs of the decoder 2 respectively. The integrator 21 integrates the Ref-Dark signal and when its output shown by waveform g reaches the reference potential VR causes the comparator output to change as shown by waveform h. This in turn causes the control logic to terminate the integrate pulse i and thus the integrator 20 whose output is shown by waveform j now holds a representation of the Sample-Dark signal as a proportion of the Ref-Dark signal. Thus the output of the integrator 20 is a regularly updated signal characteristic of the transmittance of the sample in the sample cell. The control logic 7 generates a waveform m which switches on the FET 10 to connect the output of integrator 20 to the sample and hold circuit 22 which thus forms means for measuring the characteristic signal output of the integrator 20. The sample pulse of the waveform m commences at the cessation of the integrate pulse, waveform i, and has a pulse length dependent on the magnitude of the output of the detector during the period T2 i.e. the magnitude of the radiation reaching the detector D via the path RB. As this magnitude increases the sample time and hence the bandwidth of the measuring means 22 increases and thus the signal at output 11 follows variations in the magnitude of received radiation more quickly.

Since the noise output of a system is proportional to the square root of the bandwidth it is convenient to make the sample time proportional to the square of the signal energy. Thus noise x bandwidth remains constant. In order to achieve a sample time which is proportional to the square of the signal energy the control logic circuit 7 includes a squaring circuit which squares the signal at the detector D during the period T2. The control logic circuit 7 then uses this value to determine the length of the pulses m and thus the sample time for the sample and hold circuit 22.

FIG. 4 illustrates the response of the sample and hold circuit 22 to a step input shown as waveform n. If the FET 10 is permanently on then the output at terminal 11 have the form shown as waveform p the response time depending on time constant CR of resistor R2 and capacitor C2. However, if FET 10 is switched on for 25% of the time CR then the output at terminal 11 will have the form shown as waveform q. Clearly, in this case, the rate at which the output of the sample and hold circuit 22 will follow changes in the value of the signal at its input is dependent on the time during which the FET 10 is switched on.

An amplifier as shown in FIG. 5 is connected between input terminal 1 and the decoder 2 and control logic circuit 7. The amplifier includes a pre-amplifier section 502 comprising an operational amplifier A501, a capacitor C501, resistors R501, R502 and a capacitor C502. Following the preamplifier section 502 is a differentiator 503 comprising an operational amplifier A502, resistors R503, R504 and capacitors C503, C504. The output of the differentiator 503 is fed via a line 701 to the control logic circuit 7 and via a capacitor C505 and a resistor R505 to a variable attenuator and buffer stage 504. The variable attenuator and buffer stage 504 includes an operational amplifier A503, a capacitor C506 and resistors R506, R507 and produces an output signal on line 601 which is fed to the decoder 2. The variable attenuator and buffer stage is controlled by an automatic gain comparator and amplifier stage 505 which is fed from an output of the decoder on line 501. The signal on line 501 is fed via the series arrangement of two resistors R508, R509 to the positive input of an operational amplifier A504. A potential divider comprising resistors R510, R511 connected between positive and negative supply rails has the junction of the resistors connected via a resistor R512 to the negative input of the operational amplifier A504. Two oppositely poled diodes D501, D502 are connected in parallel between the junction of resistors R508, R509 and the junction of resistors R510, R511. The output of operational amplifier A504 is fed via resistors R513, R514 to the negative input of operational amplifier A503. The junction of resistors R513, R514 being connected to the gate electrode of an FET T501. The source and drain electrode of the FET T501 are connected across a resistor R515 which is connected between the negative supply rail and the positive input of amplifier A503. A capacitor C507 is connected between the positive input of amplifier A504 and the negative supply rail, capacitor C508 is connected between the output of amplifier A504 and the negative supply rail, and a capacitor C509 is connected between the output and the negative input of amplifier A504. The variable attenuator and buffer stage is controlled by the automatic gain comparator and amplifier stage to maintain the Ref-Dark signal substantially constant despite variations in the signal level received by the detector D.

The decoder 2 is shown in greater detail in FIG. 6 and comprises four sample and hold circuits 604, 605, 606 and 607 and two subtractor circuits 608 and 609.

Sample and hold circuit 604 comprises an FET T604, a resistor R604, a capacitor C604 and an operational amplifier A604, sample and hold circuit 605 comprises an FET T605, a resistor R605, a capacitor C605 and an operational amplifier A605, sample and hold circuit 606 comprises an FET T606, a resistor R606, a capacitor C606 and an operational amplifier A606 and sample and hold circuit 607 comprises an FET T607, a resistor R607, a capacitor C607 and an operational amplifier A607.

The subtractor circuits 608 and 609 are identical in form, subtractor 608 comprising an operational amplifier A608 having its positive input biased by a resistor network comprising resistors R608, R609, R610 and R611, a capacitor C608 being connected across resistors R608 and R609. The parallel arrangement of a resistor R612 and a capacitor R612 is connected between the output and the negative input of amplifier A608. A first input of subtractor 608 is connected via a resistor R613 to the negative input of amplifier A608 while a second input is connected via a resistor R614 to the positive input of amplifier A608. Subtractor 609 is identical in form and comprises resistors R618–R623, capacitors C618 and C622 and operational amplifier A609.

The composite waveform a is applied on line 601 to the sample and hold circuits 604–607 after suitable processing in the amplifier shown in FIG. 5. Timing signals e, d, c and b are fed from terminals 3, 4, 5 and 6 respectively to sample and hold circuits 604–607. In this way during time period T1 sample and hold circuit 607 samples the composite waveform as the timing signal b causes FET 607 to conduct and stores the magnitude of the composite waveform at that time on capacitor C607. In this way a representation of the radiation falling on the detector D during the first Dark period i.e. a period when the radiation beam is deflected away from the detector D is stored. In the same way value of the Reference signal is stored on capacitor C606, the sample signal on C604 and the signal during the second Dark period on capacitor C605. The outputs of sample and hold circuits 605 and 607 are connected in common through resistors R630 and R631 so that the average value of the composite signal during the last two Dark periods is applied to one input of each of the subtractors 608 and 609. The output of sample and hold circuit 604 is applied to the other input of subtractor 608 while the output of sample and hold circuit 606 is applied to the other input of subtractor 609 and via line 501 to the automatic gain comparator and amplifier 505 (FIG. 5).

The output of subtractor 608 on line 602 provides the Sample-Dark signal which is applied to the input of integrator 20 (FIG. 2) under the control of the integrate signal i as previously described while the output of subtractor 609 on line 603 provides the Ref-Dark signal which is applied to integrator 21 (FIG. 2) also under the control of the integrate signal i.

The control logic circuit 7 is shown in detail in FIGS. 7 and 8 and comprises an energy detector 703, a squaring circuit 704, energy level comparator 705 and the logic elements shown in FIG. 8. A comparator 706 is also shown in FIG. 7 and this takes the place of the comparator shown in FIG. 2.

The energy level detector 703 has an input which is connected via line 701 to the output of the differentiator 503 (FIG. 5) and comprises a sample and hold circuit with an FET T703, resistor R703, capacitor C704 and operational amplifier A703.

The sample and hold circuit is fed via a capacitor C703 and the FET T703 is switched by waveform c so that a representation of the magnitude of the radiation falling on the detector during the period T2 is held. A resistor R723 and an FET T723 are connected in series between the junction of capacitor C703 and FET T703 and the negative supply rail. The gate of FET T723 is fed with waveform b to discharge capacitor C703 before the period T2. The output of the sample and hold circuit is connected via the series arrangement of two resistors R704 and R705 to the negative supply rail. The junction of resistors R704 and R705 forms the output of the energy level detector 703 and is connected to a squaring circuit 704.

The squaring circuit 704 includes an operational amplifier A704 whose positive input is connected to the junction of resistors R704 and R705. The output of amplifier A704 is connected to its negative input via a resistor R706. The series arrangement of two diodes D701 and D703 and a resistor R708 is connected between the negative input of the amplifier A704 and the negative supply rail. The junction of diodes D701 and D702 is connected to the negative supply rail via a resistor R707.

The squaring circuit has unity gain until diode D701 starts to conduct i.e. when the input voltage becomes greater than about 625 mV. The gain is then defined by (R706+R708)/R708 which is made to be equal to three. When the input voltage reaches 1.25 V diode D702 starts to conduct and the gain is defined by the expression $$\left( R706 + \frac{R707 \times R708}{R707 + R708} \right) / \left( \frac{R707 \times R708}{R707 + R708} \right)$$

which is made equal to six. FIG. 9 illustrates the response of the squaring circuit to an input signal which ranges between 0 to 2.5 volts. The response is a straight line approximation which is correct at 25%, 50% and 100% of the maximum input signal. In practice at each of the diode break points the curve is smoothed by the gradual turn-on of the diodes. The output voltage of the squaring circuit $\simeq 1.6(Vin)^2$.

The energy level comparator 705 comprises a constant current source for charging a capacitor C705, a comparator and a switch controlled by a reference level comparator 706 which is in modified form the reference level comparator of FIG. 2. The constant current source comprises a pnp transistor T705, having its emitter connected to the positive supply rail via a resistor R710 and its base connected to a potential divider comprising a resistor R711 and a preset potentiometer R712 connected between the positive and negative supply rails. The junction of the collector of transistor T705 and the capacitor C705 is connected via a resistor R713 to the negative input of a fast comparator A705, which together with its associated components, i.e. diode D703 and resistors R714 and R715, forms a comparator. A switch comprising an FET T704 connects the output of the squaring circuit 704 to the junction of capacitor C705 and the collector of transistor T705. The FET T704 is controlled by the output of the reference level comparator 706 via a diode D704 and a resistor R709.

The reference level comparator comprises an operational amplifier A706 having its negative input connected to a potential divider comprising two resistors R716 and R717 connected between the positive and negative supply rails. A resistor R718 is connected between an input line 702 which is connected to the output of the reference integrator 21 and the positive input of amplifier A706. A diode D706 is connected between the positive and negative inputs of amplifier A706 while a resistor R719 is connected between its positive input and its output. The output of amplifier A706 is connected to the positive supply rail via a resistor A720 and via a diode D707 to an output line 707. The output line 707 is connected to a positive supply rail via a resistor R721.

In operation the energy level detector 703 samples the magnitude of the composite waveform a during the period T2 and holds this value on capacitor C704 and thus presents a signal representing the magnitude of the radiation passing through the reference cell to the input of the squaring circuit 704. The output of the squaring circuit is applied to the energy level comparator 705 via the FET T704 which is controlled by the output of the reference level comparator 706 so that the capacitor C705 is discharged to produce a negative voltage proportional to the square of the magnitude of the radiation passing through the reference cell at the junction of capacitor C705 and resistor R713 when the reference comparator output is positive. When the reference comparator output goes negative FET T704 is switched off and the capacitor is charged linearly by the constant current source. This action is illustrated by waveform k in FIG. 3. Waveform k causes the output of comparator A705 to take the form shown in FIG. 3 as waveform l. As can be seen from FIG. 3 the mark/space ratio of waveform l depends on the magnitude of the output of the squaring circuit 704. The output of the comparator A705 is modified in the control logic circuit 7 as described hereinafter to produce the control signal for sample and hold circuit 22 of FIG. 2.

FIG. 8 shows an arrangement of logic circuitry for producing the waveforms i, f and m of FIG. 3. Inputs 4 and 6 are connected to the inputs of an OR gate 800 whose output is connected to the input of a monostable multivibrator 801. Thus the leading edge of the pulses corresponding to times T1 or T3 will cause the monostable multivibrator 801 to produce a pulse which sets two bistable circuits 802 and 803. The Q̄ output of bistable circuit 803 is connected via an invertor 804 to output line 805 and produces the waveform i to govern the operation of the integrators 20 and 21 of FIG. 2. The bistable circuit 803 is reset either when the reference comparator output on line 707, which is connected to the reset input of bistable circuit 803, goes negative, i.e. the reference integrator 21 output has reached a preset value, or at the end of the next T2 or T4 period. Inputs 3 and 5 are connected to the inputs of a NOR gate 806 whose output is connected to the input of a monostable multivibrator 807. The output of the monostable multivibrator 807 is connected to the clock input of bistable circuit 803 and thus the back edge of waveform c or e will cause the bistable circuit 803 to change state. Thus either the end of period T2 or T4 or the output of integrator 21 reaching a preset value will cause the pulse i to cease. The Q output of bistable circuit 803 is connected to an inhibit input on the monostable circuit 807 so that the monostable circuit 807 will not produce an output pulse to clock the bistable circuit 803 if the integration has been completed, and hence the bistable circuit 803 is reset via line 707, before the end of the reference or sample period, times T2 and T4.

The output of reference level comparator 706 on line 707 is connected via an invertor 808 to an input of a NAND gate 809 the other input of which is connected via line 708 to the output of the energy level comparator 708. The output of NAND gate 809 is connected via an invertor 810 to an output line 811. Thus waveforms h and l are combined in NAND gate 809 to produce a sample and hold pulse m whose pulse length is proportional to the output of the squaring circuit 704 and hence proportional to the square of the energy received by the detector D during the period T2 i.e. when radiation passing through the reference cell falls on the detector.

The output of NOR gate 806 also resets bistable circuit 802 at the start of periods T2 and T4 and is applied to one input of a NAND gate 812 the other input of which is connected to the output of bistable circuit 802. The output of NAND gate 812 is connected to an invertor 813. The output of NAND gate 809 is connected to an invertor 814 which is in turn connected to an invertor 815. The outputs of invertors 813 and 815 are connected in common and fed to an output line 816 via which the zero clamp signal, waveform f, is connected to the integrators 20 and 21 of FIG. 2. Thus the zero clamp signal only occurs in the intervals between periods T2 and T3 and T4 and T1.

In an alternative embodiment the signals representing the level of the radiation falling on the detector during each of the periods T1 to T4 may be measured by an integrating digital voltmeter and stored. The differences and ratio of Sample-Dark to Ref-Dark may then be calculated in an arithmetic unit. The response time can be varied by taking the average of the results over a period which is made dependent on the magnitude of the signal during period T2. If this technique is used it would also be possible to weight the significance given to the measured results during the period over which the average is taken, e.g. to give greater significance to the latest measurements.

We claim:

1. A dual beam ratio recording spectrophotometer comprising a radiation source, a radiation detector, a first path between said source and detector which includes a sample cell, a second path between said source and detector which includes a reference cell, means for alternately directing radiation through said first and second paths onto said detector, and a processing circuit for processing output signals from said detector, said processing circuit including means for producing a characteristic signal representative of a characteristic of a substance in said sample cell and for updating said characteristic signal at regular intervals, and means for measuring said characteristic signal, said measuring means including means for varying the bandwidth of said measuring means in proportion to the magnitude of radiation received by said detector from said second path.

2. A spectrophotometer according to claim 1, wherein said bandwidth of said measuring means is proportional to the square of the magnitude of radiation received by said detector from said second path.

3. A spectrophotometer according to claim 1, wherein said measuring means includes a sample and hold circuit for making the sample time and bandwidth of said measuring means dependent on the magnitude of radiation received by said detector from said second path.

4. A spectrophotometer according to claim 3, wherein said processing circuit includes a second sample and hold circuit for sampling the magnitude of radiation received by said detector from said second path and for producing an output signal dependent thereon, said output signal being used to determine sample time of the first sample and hold circuit.

5. A spectrophotometer according to claim 4, wherein said output signal of said second sample and hold circuit is fed to the input of a squaring circuit having an output signal for determining said sample time of said first sample and hold circuit.

6. A spectrophotometer according to any of claims 1-5, wherein said means for producing and updating said characteristic signal includes means for sampling output signals from said detector to produce first and second signals dependent on the magnitude of radiation received by said detector from said first and second paths respectively, means for maintaining said second signal constant, means for separately integrating said first signal and the constant second signal over a period of time necessary for the integrated value of said constant second signal to reach a predetermined value such that at the end of said period of time the integrated value of said first signal is said characteristic signal, and means for resetting said integrating means at regular intervals.

7. A spectrophotometer according to claim 6, wherein said means for resetting said integrating means at regular intervals is operative each time after radiation following said first path has been directed onto said detector, and each time after radiation following said second path has been directed onto said detector.

* * * * *